April 20, 1965 B. M. BRENNER 3,179,752

CAPSTAN SERVO SYSTEM

Filed Aug. 22, 1960 7 Sheets-Sheet 1

BERNARD M. BRENNER
INVENTOR.

BY

Robert G. Clay
ATTORNEY

BERNARD M. BRENNER
INVENTOR.

BY
Robert G. Clay
ATTORNEY

April 20, 1965 B. M. BRENNER 3,179,752

CAPSTAN SERVO SYSTEM

Filed Aug. 22, 1960 7 Sheets-Sheet 3

BERNARD M. BRENNER
INVENTOR.

BY
Robert H. Clay
ATTORNEY

April 20, 1965 B. M. BRENNER 3,179,752

CAPSTAN SERVO SYSTEM

Filed Aug. 22, 1960 7 Sheets-Sheet 4

BERNARD M. BRENNER
INVENTOR.

BY

Robert G. Clay
ATTORNEY

BERNARD M. BRENNER
INVENTOR.

BY
Robert S. Clay
ATTORNEY

BERNARD M. BRENNER
INVENTOR.

BY
Robert S. Clay
ATTORNEY

April 20, 1965 B. M. BRENNER 3,179,752

CAPSTAN SERVO SYSTEM

Filed Aug. 22, 1960 7 Sheets-Sheet 7

BERNARD M. BRENNER
INVENTOR.

BY

Robert S. Clay
ATTORNEY

1

3,179,752
CAPSTAN SERVO SYSTEM

Bernard M. Brenner, Menlo Park, Calif., assignor to Ampex Corporation, Redwood City, Calif., a corporation of California Filed Aug. 22, 1960, Ser. No. 51,059
8 Claims. (Cl. 179—100.2)

The present invention relates to a control system for the transport of a thin pliable film between two reels and, in particular to such a system for a magnetic tape recorder and reproducer for driving a capstan at a constant angular velocity during recording and at a servo-controlled angular velocity during reproducing.

In the past it has been the practice during the record operation of a magnetic tape recorder to power the capstan synchronous motor from a constant frequency source and, at the same time, to record a reference control track on the tape. For the reproduce operation, then, a signal developed from the control track has been compared with a standard signal to provide error signals corresponding to deviations between the two signals. The power to the capstan motor was controlled in response to the error signals for providing proper tracking.

The foregoing system requires that the full power for the capstan motor be controlled during the reproduce operation, which is not easily accomplished in a simple manner as it requires elaborate and costly electrical circuitry. Further, the substantially large motor inertia in such system limits the response of the motor to the error signals.

It is therefore an object of the present invention to provide a new and improved control system for the transport of tape.

Another object of the invention is to provide a simplified servo-type control system for a capstan drive motor of a magnetic tape recorder.

A further object of the invention is to provide a capstan control system wherein the power required to control the capstan during the reproduce operation is substantially reduced below that previously required.

A still further object of the invention is to provide a capstan control system having reduced inertia in the servo portion of the capstan drive.

In accordance with the present invention, a single belt-driven planetary reduction arrangement includes a constant angular velocity drive for the capstan and a corrective angular velocity displacement drive. Such planetary system also provides a differential arrangement for combining the two drives at the capstan to achieve the aforementioned objects of the invention.

Other objects and advantages of the invention will be apparent from the following description and claims considered together with the accompanying drawings, in which:

2

Figure 4:
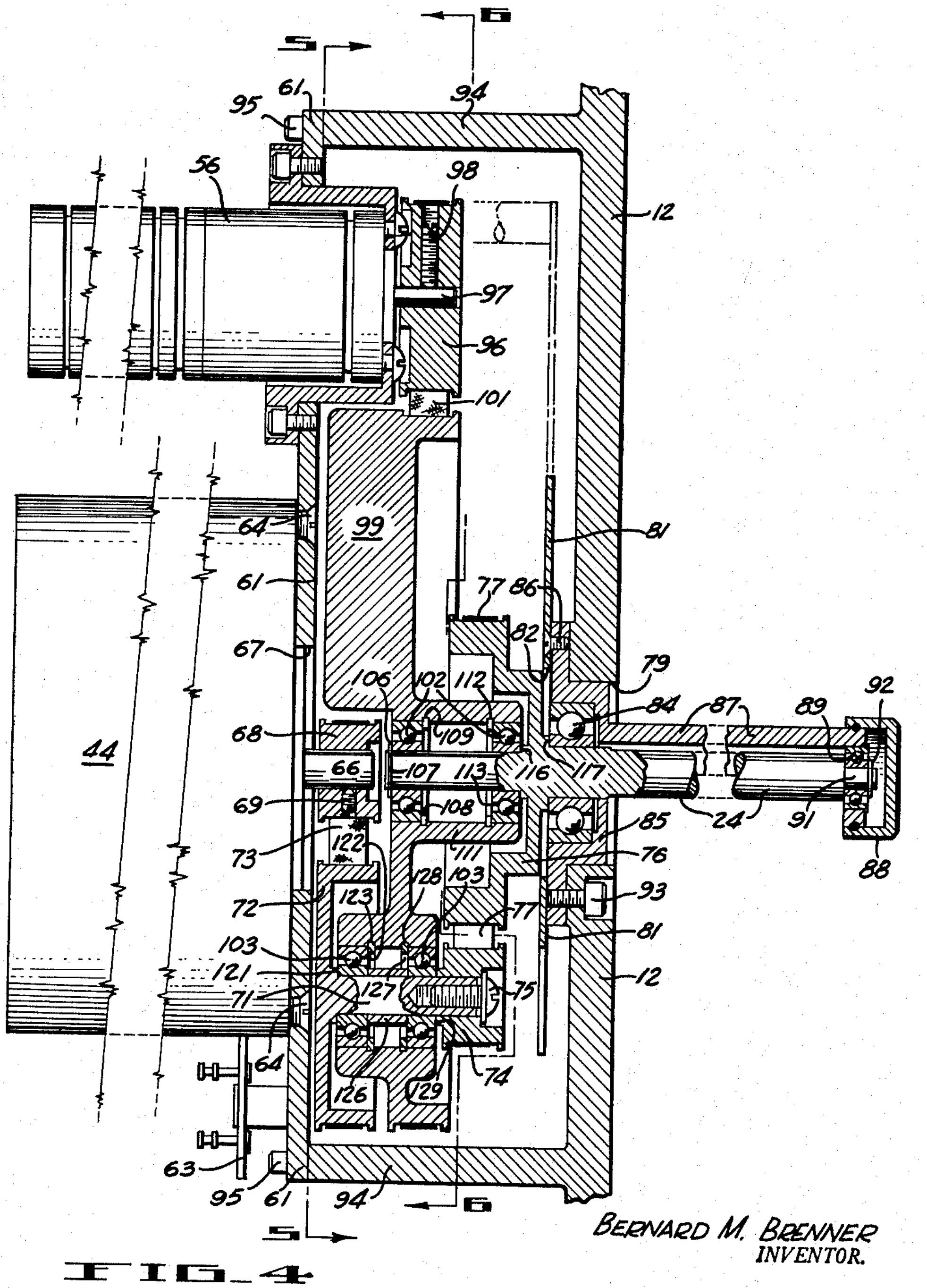
FIGURE 4 is a cross section view taken along the line 4—4 of FIGURE 3.
Figure 8:
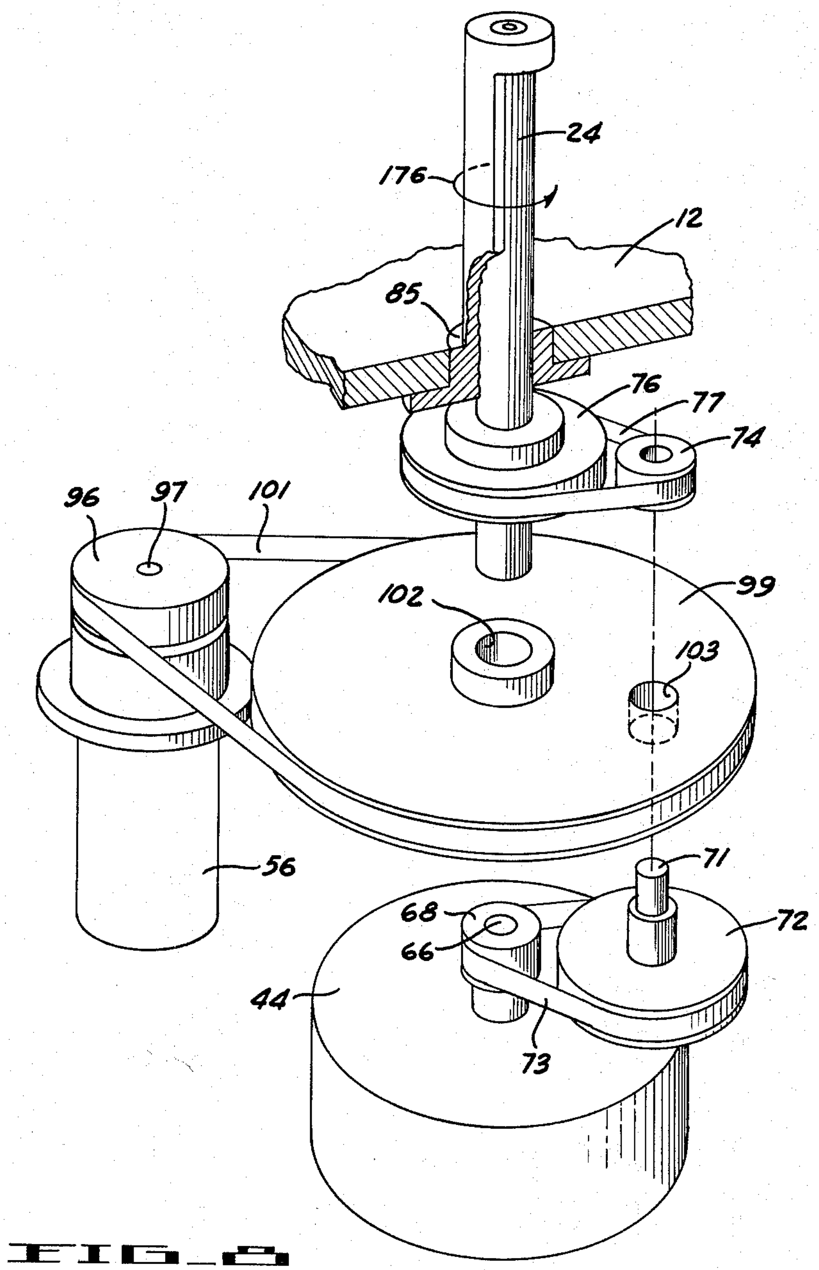

FIGURE 8 is a simplified and exploded view of FIGURE 4 in perspective.

Figure 1:
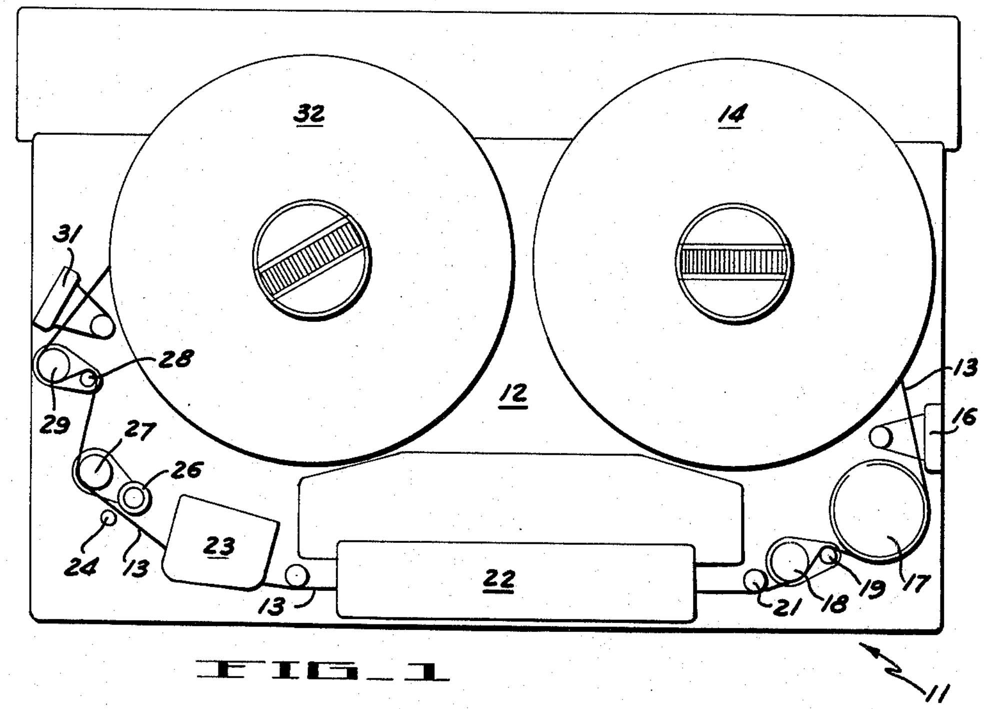
FIGURE 1 is a schematic plan view of a typical magnetic tape recorder with which the present invention may be used.

Referring now to the drawings in detail, FIGURE 1 in particular, a tape transport system of a typical magnetic recorder and reproducer 11 is shown extended across a panel 12. Magnetic tape 13 is extended from a supply reel 14, which is suitably mounted on a turntable (not shown). The tape 13 passes through a supply reel photocell assembly 16 over a heated tape guide 17, around the combination of a rotary guide 18 and slack takeup idler 19, past a fixed guide 21, and then to a wideband head assembly 22, where recording and reproducing of information on the tape occurs. From the head assembly 22 the tape 13 passes through an auxiliary head assembly 23, which includes a control track head 25 (see FIGURE 2), and between a capstan 24 and combination of a pinch roller 26 and rotary guide 27. From the rotary guide 27 the tape 13 is further extended to engage a second slack takeup idler 28 and rotary guide 29 combination, then through a takeup reel photocell assembly 31 and finally to the takeup reel 32, which is also mounted on a suitable turntable (not shown).

In operation of the tape transport, as described in the foregoing, the tape 13 is moved between the supply and takeup reels 14 and 32 by the capstan 24 and pinch roller 26 in combination. The capstan 24 is a driven element that rotates at a constant angular velocity during the record operation and the tape 13 is selectively clamped to the capstan by the pinch roller 26, which may be moved toward or away from the capstan. Thus, when the pinch roller 26 is moved toward the capstan 24, rotation of the capstan results in a linear movement of the tape 13.

Figure 2:
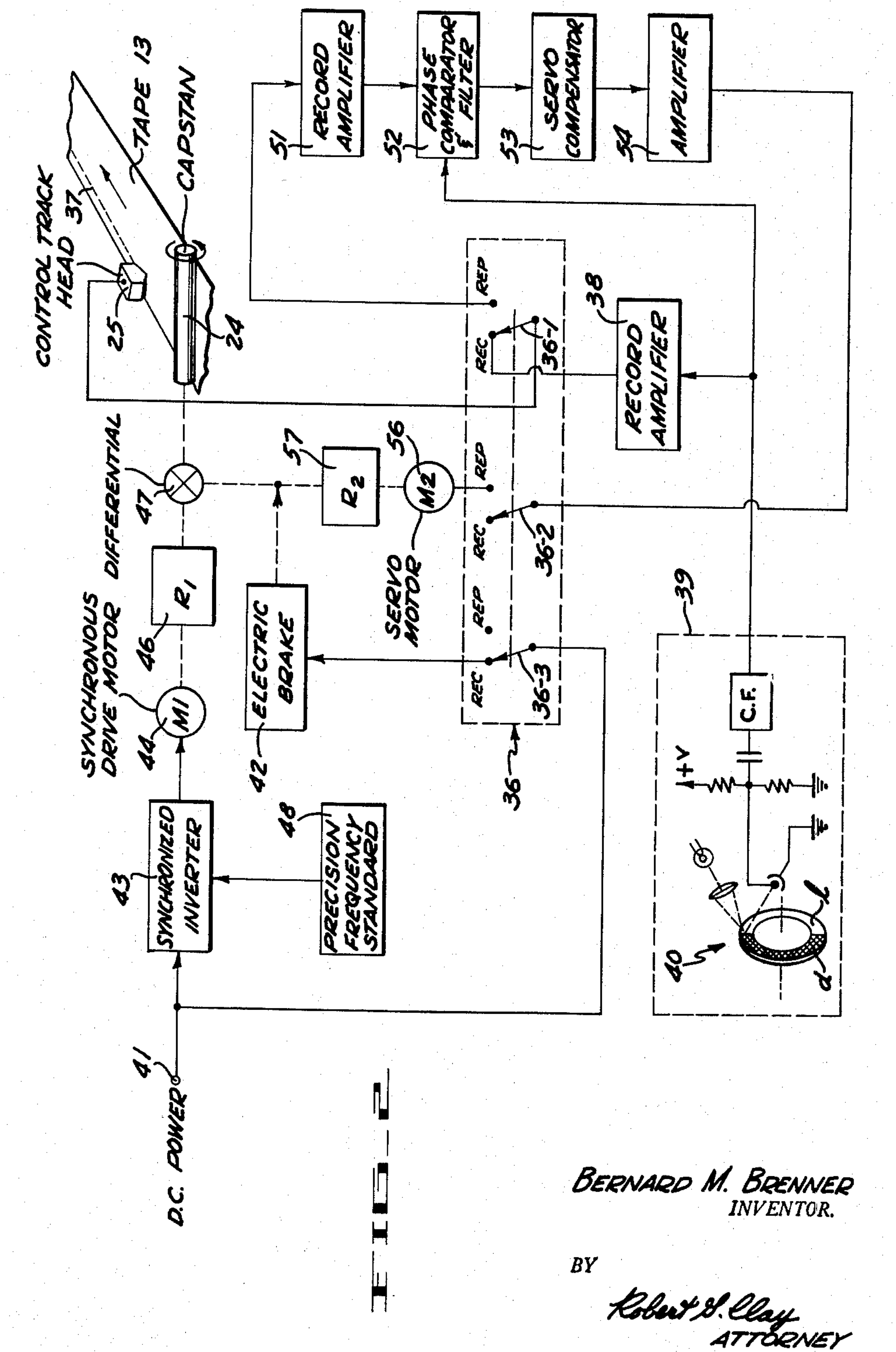
FIGURE 2 is a schematic diagram illustrating in block form the electrical aspects of the invention in connection with the magnetic tape.

As shown in the schematic diagram of FIGURE 2, a tandem switch 36 has three sections 36–1, 36–2, and 36–3 in the control circuit of the capstan 24. Each of the three sections of such switch 36 has two positions labeled "Rec" for record and "Rep" for reproduce, respectively. With the switch 36 thrown to the "Rec" position, section 36–1 connects the control track head 25 through a record amplifier 38 to a source 39 of alternating current, which for proper synchronization of the reproduce and record operation is a 200 cycles per second signal developed at a pickoff of a head drum arrangement 40 (see FIGURE 2) in the wideband head assembly 22. For details with respect to the development of such 200 c.p.s. signal, reference is made to U.S. Patent No. 2,921,990, or U.S. Patent No. 2,942,061, both of common assignee. Thus, a 200 c.p.s. control track 37 is recorded longitudinally along the tape 13 by the head 25 and the signal is related to the speed of the heads within the wideband head assembly 22. Section 36–2 of the switch 36 is open circuited in such "Rec" position. The third section 36–3 connects a source 41 of direct current directly to an electric brake 42, which will be explained more fully hereinafter. The source 41 of direct current is, also directly connected to a synchronized inverter 43 to drive a synchronous drive motor 44, which is mechanically coupled through a speed reduction arrangement 46 and differential arrangement 47 to the capstan 24. A precision frequency standard 48 is connected to the inverter 43 to provide accurate synchronization thereof and deliver an accurate and constant drive power to the motor 44.

With the switch in the "Rep" position, section 36–1 connects the control track head 25 to the input of a reproduce amplifier 51, the output of which is connected to one of two inputs of a phase comparator and filter 52. The second of the two inputs of such phase comparator and filter 52 is connected to the source 39 of 200 c.p.s. alternating current. Thus, the phase of the signal derived from the control track 37 by the head 25 is compared to the phase of the signal from the source 39, and any deviation therebetween results in an error signal, which is filtered and applied to the input of a servo compensator 53. The output of the servo compensator 53 is then utilized to control a power amplifier 54 by an input connection thereto. The output of the amplifier 54 is connected to switch section 36–2 to apply drive power to a servo controlled motor and speed reduction gear assembly 56. Mechanical coupling is provided between the drive shaft of the motor 56 and the differential 47 by way of a speed reduction arrangement 57. With such structure the angular velocity of the capstan 24, as driven by the synchronous motor 44 is varied by the drive of the servo control motor 56 in response to the error signals. It is to be noted that the electric brake 42 operates on the servo controlled drive structure during the record operation, during which time the servo motor 56 is disconnected, so that such portion of the system has no effect on the angular velocity of the capstan 24.

Figure 3:
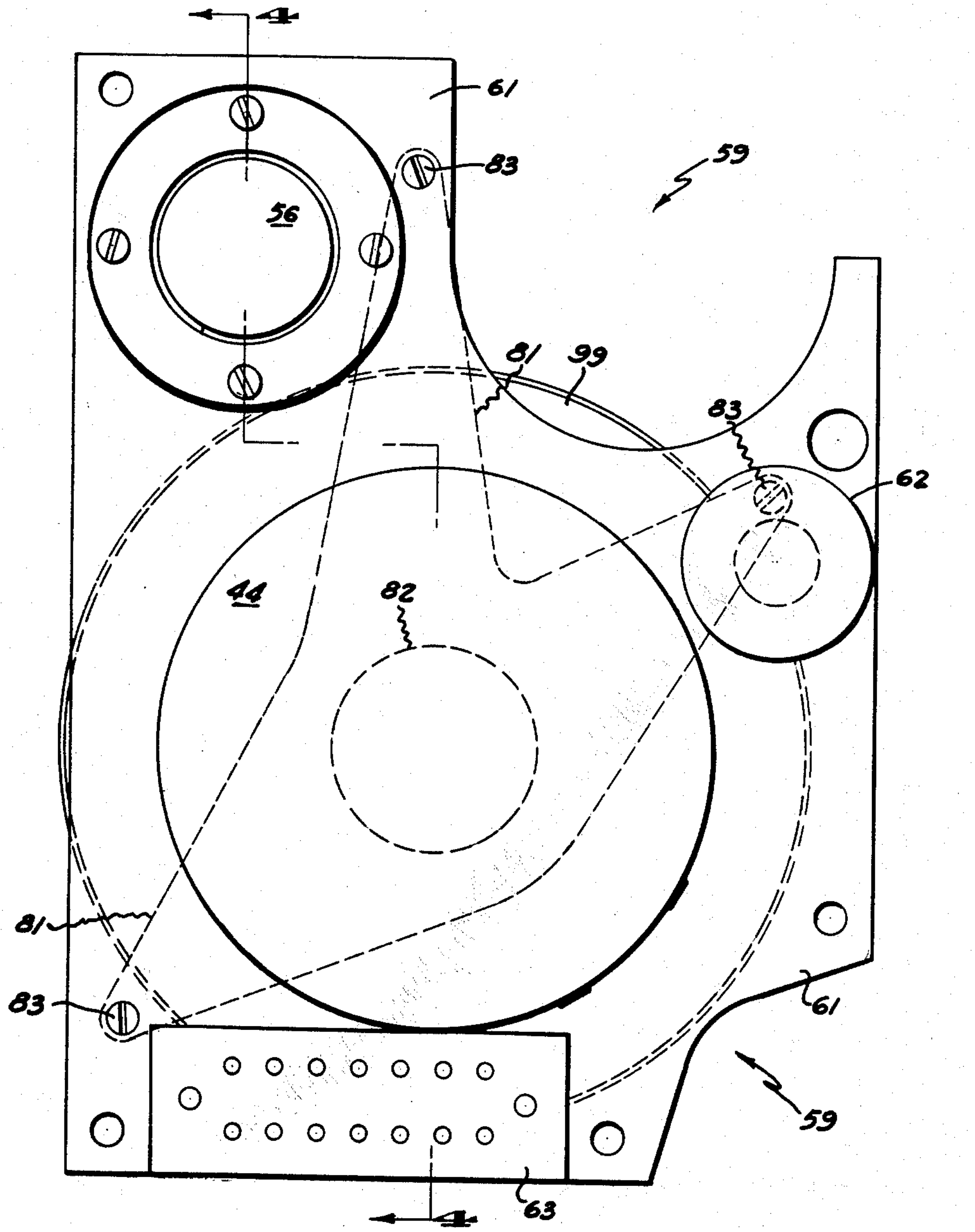
FIGURE 3 is a bottom view of a planetary arrangement in accordance with the invention.

In practice the mechanical coupling between the synchronous drive motor 44, the servo control motor 56, and the capstan 24 (including the two speed reduction arrangements 46, 57 and the differential) are incorporated in a planetary system 59, as illustrated in FIGURE 3. A motor mounting plate 61 is suitably mounted parallel to and in fixed spaced apart relation with respect to the panel 12 to support the synchronous drive motor 44 and the servo control motor 56. Also mounted on the motor plate 61 are a brake actuating solenoid 62 of the electric brake 42 and a terminal board 63.

As best seen in the cross section view of FIGURE 4, the synchronous drive motor 44 is centrally mounted, as by a plurality of screws 64, on the motor mounting plate 61 with the drive shaft 66 extending through an opening 67 of the plate. A first pulley 68 is suitably secured, as by a set screw 69, to the extended portion of the drive shaft 66. To reduce the angular velocity of the motor drive shaft 66 at a parallel driven shaft 71, a second pulley 72 having a larger diameter than the first pulley 68 is suitably secured to the driven shaft at the lower end thereof in the same plane as the first pulley with a belt 73 trained about the two pulleys. A third pulley 74 having substantially the same diameter as the first pulley 68 is also secured to the driven shaft 71 at the upper end for rotation at the reduced velocity. For ease of assembly one of the pulleys 72 is unitary with the driven shaft 71, while the other 74 is secured by an axially mounted screw 75.

To drive the capstan 24 at a further reduced velocity with respect to the drive shaft 66, a fourth pulley 76 having a larger diameter than the third pulley 74 is mounted on the capstan to lie in the same plane as the third pulley with a second belt 77 trained about such pulleys. As illustrated in FIGURE 4 the capstan 24 is disposed in longitudinal alignment with the drive shaft 66 and the only coupling between the two is by way of pulley and belt combinations. To suitably mount the capstan 24 transversely through an opening 79 in the panel 12, a flexible plate 81 is provided with a clearance opening 82 through which the capstan is extended. The plate 81 is suitably secured, as by screws 83, to the motor plate 61 and serves to maintain the various elements of the planetary system 59 in position until suitably secured to the panel 12, as described hereinafter. The extended portion of the capstan 24 is rotatably secured by a ball bearing 84 retained within a housing 85 secured, as by screws 86, on the upper surface of the plate 81. A support 87 extends from the housing 85 parallel to the capstan 24 for the length thereof and terminates in a cover 88 mounted transversely over the capstan. To rotatably support the upper end of the capstan 24 a ball bearing 89 is mounted within the cover 88 to engage the capstan at a decreased portion 91. A retaining ring 92 engaging the upper end of the capstan 24 and the bearing 89 is provided to maintain the aforementioned relationship between the capstan 24 and ball bearings 84 and 89. Also, the housing 85 is secured, as by screws 93, to the panel 12 and the panel is provided with extended support elements 94 secured by screws 95 to the motor plate 61 at the extended portions thereof.

In accordance with the structure described in the foregoing paragraphs with suitable power connected to the synchronous motor 44, the first pulley 68 rotates to drive the shaft 71 at a reduced angular velocity through the belt 73 and second pulley 72. The angular velocity of the shaft 71 is further reduced by the combination of the third pulley 74, belt 77 and capstan pulley 76, the latter of which then drives the capstan 24 at a reduced constant angular velocity.

To synchronize the reproduce operation with the record operation, the previously described servo loop operates to power the servo control motor and speed reduction gear assembly 56. Rotation of the armature (not shown) of the servo control motor 56 then revolves a first servo pulley 96 mounted on the drive shaft 97 thereof, as by a set screw 98. A second servo pulley 99, having a substantially larger diameter than the first servo pulley 96, is mounted on the same plane as the first servo pulley with a belt 101 trained about the two servo pulleys 96 and 99. Such second servo pulley 99 is provided with a suitable and centrally disposed journal, such as a pair of spaced-apart ball bearings 102 within which the lower end of the capstan 24 rotates. Also, the second servo pulley 99 has another pair of spaced-apart ball bearings 103 that is mounted within and radially outward from the central journal 102 with the driven shaft 71 rotatably secured therein.

To support the second servo pulley 99 on the capstan 24, several retaining rings are utilized. Thus, a first retaining ring 106 is inserted in a groove 107 at the lower end of the capstan 24 to extend into supporting engagement with the lower ball bearing 102 of the second servo pulley 99. A second retaining ring 108 is inserted into a matching groove 109 at a hub portion 111 of the second servo pulley 99 to engage the upper portion of the lower bearing 102. To retain the upper bearing 102 in position a second groove 112 in the hub 111 receives a third retaining ring 113, which extends as a shoulder to engage the upper bearing. It is to be noted that the fourth pulley 76 may be unitary, as shown, with the capstan 24 and machined, or otherwise conventionally formed, to provide a ledge 116 engaging the upper bearing 102 and a shoulder 117 to engage the principal bearing 84 of the capstan.

Also, to retain the relative position of the second and third pulleys 72, 74 eccentrically within the second servo pulley 99, the lower ball bearing 103 abuts against a ledge 121 of the second pulley 72 and a retaining ring 122 is inserted into a groove 123 of the second servo pulley 99 to engage the lower bearing 103 at the upper portion thereof. A sleeve spacer 126 surrounds the driven shaft 71 between the two bearings 103 and maintains the spacing. Additionally, a retaining ring 127 is inserted in a groove 128 of the second servo pulley 99 to extend and support the lower portion of the upper bearing 103. Finally, the third pulley 74 is provided with a shoulder 129 that abuts the upper portion of the upper bearing 103.

In the foregoing manner the entire planetary assembly is made unitary so that, when the capstan 24 is being driven at a constant angular velocity by the drive motor 44, an error correction is added by energization of the servo control motor 56. Thus, in response to an error signal the first servo pulley 96 is rotated and through the belt 101 the second servo pulley 99. Because the servo pulley 99 is larger in diameter than the first servo pulley 96 a speed reduction occurs, and the effect thereof will be set forth hereinafter. Rotation of the second servo pulley 99 results in a displacement, clockwise or counterclockwise, or the eccentrically mounted combination of second and third pulleys 72, 74 together with the coupling drive shaft 71. There is then a change in the angular velocity at which the capstan 24 is driven to correct for any errors detected between the recording and reproducing operations.

Figure 5:
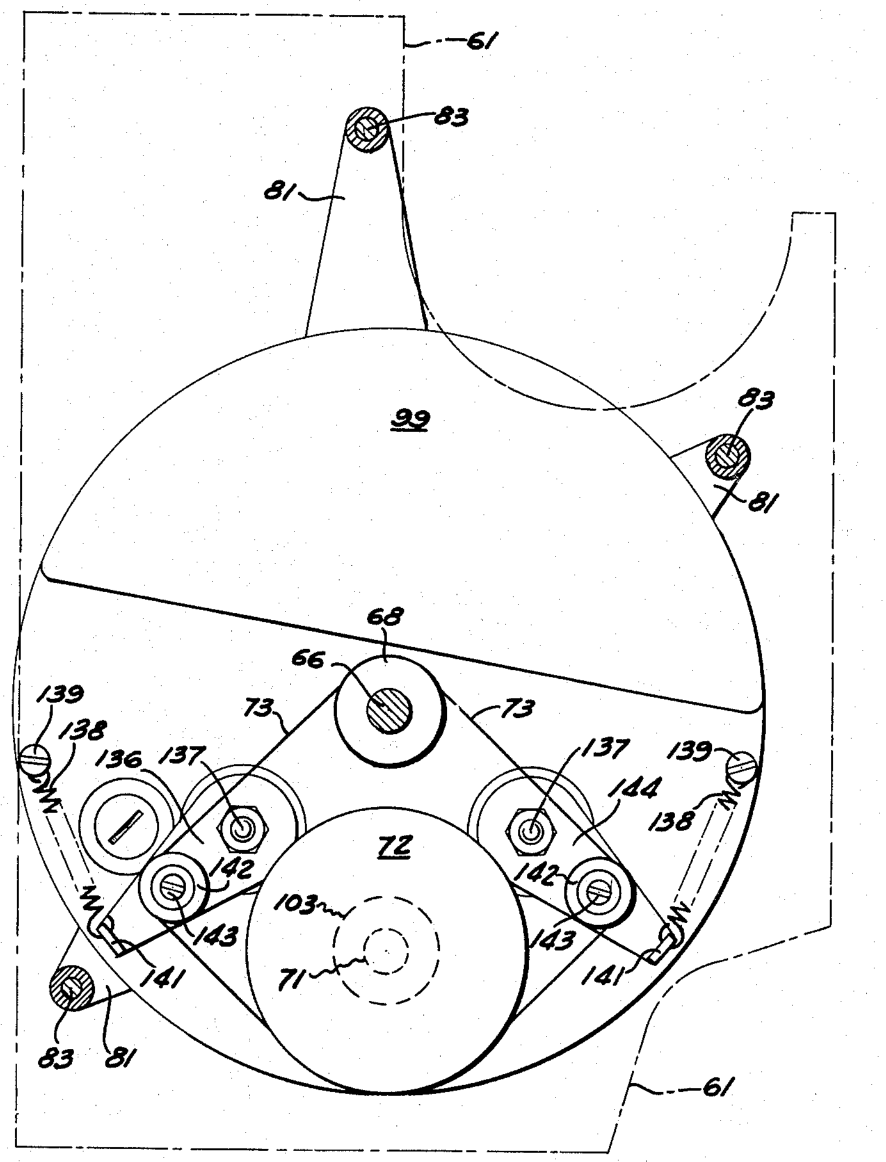
FIGURE 5 is a view taken along the line 5—5 of FIGURE 4.

To improve the accuracy with which the synchronous motor 44 drives the capstan 24, particularly during the reproduce operation, the two belts 73 and 77 in the drive system are provided with tensioning assemblies. Thus, as shown in FIGURE 5, a first tension arm 136 is mounted on the second servo pulley 99 to extend substantially along a radius disposed 45 degrees clockwise from a radius including the centers of the first and second pulleys 68 and 72. The innermost end of the arm 136 is pivoted at a stub shaft 137 with a helical spring 138 suitably secured at one end to the pulley 99, as by a screw 139, and at the other end to the outermost end of the arm, as by a hook and aperture arrangement 141. Substantially midway of the length of the tension arm 136 there is provided a pulley 142 that is rotatably secured to the arm, as by a screw 143, to engage the belt 73. A second similar tension arm 144 is mounted on the second servo pulley 99 to extend along a radius substantially 45 degrees counterclockwise from the radius containing the centers of the first and second pulleys 68 and 72. The elements of the two tension arms 136 and 144 are identical and, for ease of description, are assigned the same reference numerals.

The foregoing tensioning assembly therefore comprises two tension arms 136 and 144 and for proper operation the two helical springs 138 exert an oppositely directed force, respectively. In such manner the arms 136 and 144 are maintained in a substantially symmetrical relationship on either side of the first and second pulleys 68 and 72. Such assembly then provides a substantially constant tension on the belt 73 when the belt is extended about both tension arm pulleys 142 as well as the first and second pulleys 68 and 72.

Figure 6:
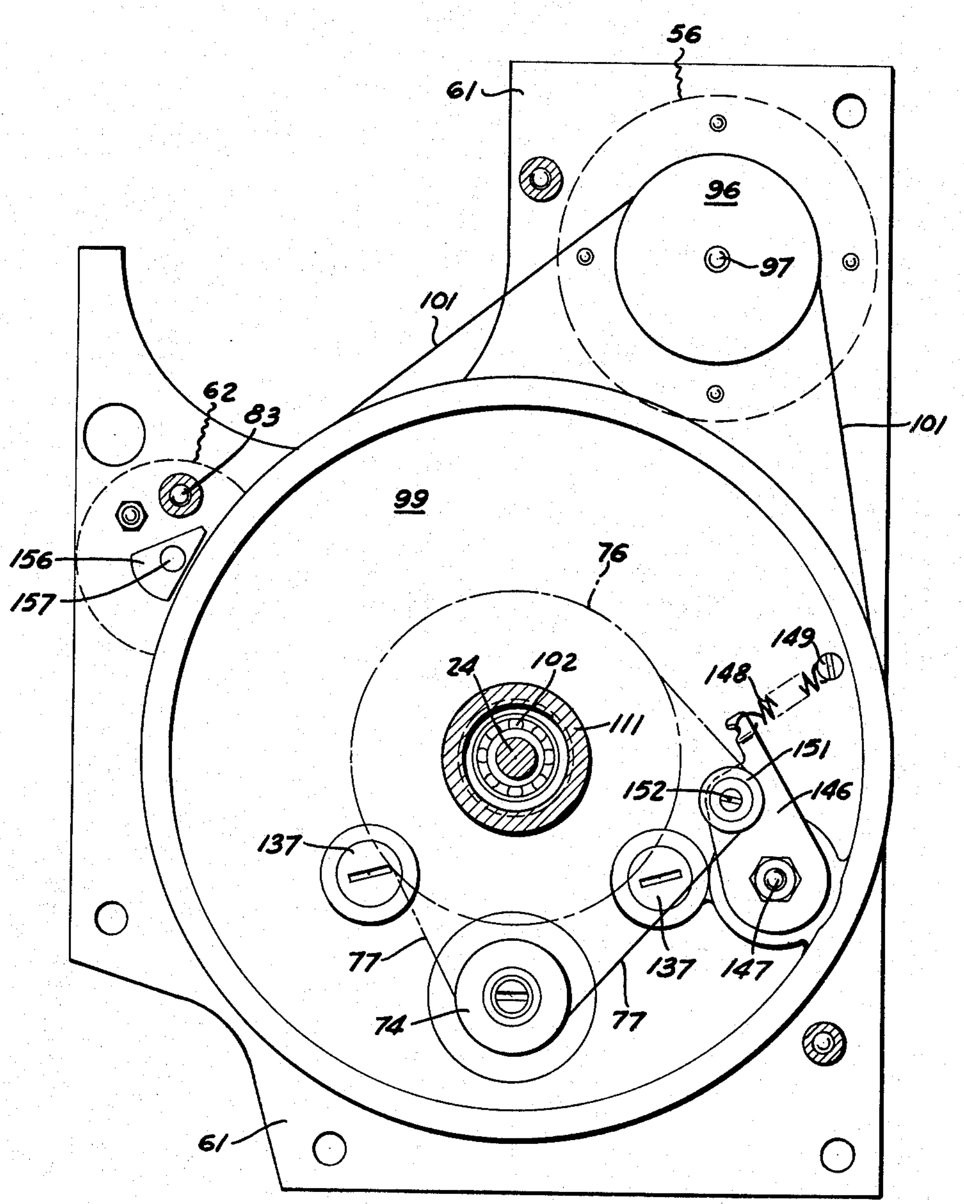
FIGURE 6 is a view taken along the line 6—6 of FIGURE 4.

To similarly provide tension to the belt 77 another tension arm 146, as shown in FIGURE 6, is pivotably mounted by a stub shaft 147 on the second servo pulley 99 on the opposite side thereof from the other two tension arms 136 and 144. The shaft 147 lies on a line including the two shafts 137 and the tension arm 146 is maintained at an angular position with respect to such line by a helical spring 148 engaging the free end of the arm and suitably secured to the pulley 99 by a screw 149. An intermediately mounted pulley 151, as by a screw 152, of the arm 146 engages the belt 77 as trained about the third and fourth pulleys 74 and 76. A substantially constant tension is then maintained on the belt 77 under all conditions, including stretching.

Also shown in FIGURE 6 is a brake pad 156, such as rubber, of substantially triangular configuration mounted on the armature shaft 157, as extended through the motor plate 61, of the brake solenoid 62, which is of the rotary type. When the solenoid 62 is energized the shaft rotates so that one side of the base of the triangular pad 156 engages the second servo pulley 99 to prevent rotation thereof. It is to be noted that the brake solenoid 62 can only be utilized during the record operation (see FIGURE 2).

Figure 7:
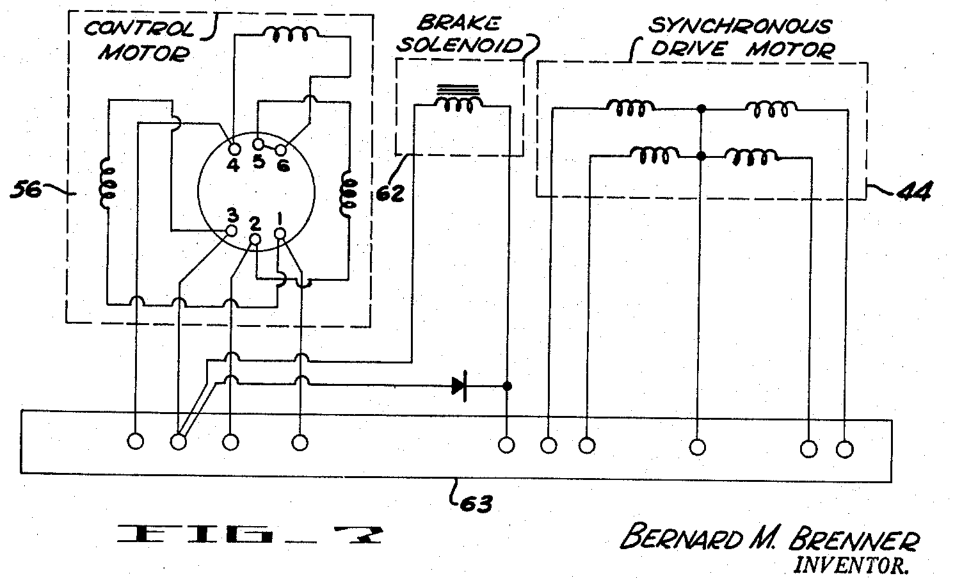
FIGURE 7 is a wiring diagram of the motors of FIGURE 4.

Wiring connections between the terminal board 63 and the synchronous motor 44, the servo control motor 56, and the brake solenoid 62 are illustrated in FIGURE 7, whereas the external connections to the terminal board are shown schematically in FIGURE 2. Since the foregoing connections are conventional and readily understood from the previous description, further details thereof will be omitted.

The operation of the planetary system may be more readily understood by reference to the simplified and exploded view of FIGURE 8. As described previously the synchronous motor 44 is energized by the power of constant frequency at the output of synchronized inverter 43 during both the record and reproduce operation. The motor shaft 66 rotates the first pulley 68 and such rotation is transferred by the belt 73 to the second pulley 72. Since the second pulley 72 has a larger diameter than the first pulley 68, the angular velocity of the driven shaft 71 is reduced below that of the motor shaft 66. As the driven shaft 71 rotates the motion of the third pulley 74 is transferred to the fourth or capstan pulley 76. Further reduction of the angular velocity occurs between the latter two pulleys because of the difference in diameter. In such manner the capstan 24 is rotated at a constant angular velocity at a rate that is a fraction of the angular velocity of the shaft 66 of the synchronous motor 44.

During the record operation the electric brake 42 is operated by energization of the brake solenoid 62 to rotate the rubber brake pad 156 into contact with the second servo pulley 99. Such action is necessary to prevent the second servo pulley 99 from rotating and thereby altering the angular velocity at which the capstan 24 is being driven. The foregoing is required because the capstan 24 is centrally mounted at a journal 102 within the pulley 99 and the driven shaft 71 extends through an eccentrically disposed journal 103 of the pulley.

During the reproduce operation the brake pad 156 is released from the second servo pulley 99 by deenergization of the brake solenoid 62. As long as the signal from the control track 37 is in phase with the signal from the 200 c.p.s. source 39, the error signal generated by the phase comparator is zero, the shaft of servo motor 56 remains stationary and the angular velocity of the capstan 24 remains constant. However, when such signals are not in phase an error signal is developed and coupled to the servo control motor 56. As the motor shaft 97 rotates, the rotation of the first servo pulley 96 is transferred by the belt 101 to the second servo pulley 99. The central journal 102, in which the capstan 24 is rotating, is the point about which the pulley 99 rotates to move the eccentric journal 103 either clockwise or counterclockwise. Since the driven shaft 71 and two pulleys 72 and 74 are supported by the pulley 99 and are free to move therewith, rotation of the pulley 99 either adds to or subtracts from the angular velocity of the capstan 24 as driven by the belt 77.

Assume that the capstan 24 is rotated in a counterclockwise direction, as indicated by an arrow 176 in FIGURE 8, and that an error signal is developed such that the servo control motor 56 drives the second servo pulley 99 counterclockwise. As the second servo pulley rotates in a counterclockwise direction the driven shaft 71 and two pulleys 72, 74 also move in a counterclockwise direction about the central journal 102. Thus, there are two components of angular velocity imparted to the capstan 24 through the belt 77. One component is due to the principal drive provided by the synchronous motor 44 at the belt 77 through the driven shaft 71 and the other is due to the servo drive provided by the servo control motor 56 in rotating the driven shaft 71 about the capstan 24. Since both components are counterclockwise, the angular velocity of the capstan 24 is the sum of the two components. The foregoing occurs whenever the signal from the control track 37 on the magnetic tape 13 lags the signal from the 200 c.p.s. source 39.

Alternatively, when the capstan is rotated in a counterclockwise direction and the signal from the control track 37 leads the signal from the 200 c.p.s. source 39, the servo control motor 56 is energized to rotate the second servo pulley 99 in a clockwise direction. The result is that the servo component of the angular velocity at the capstan 24 is opposite in direction with respect to that of the drive component. Thus, the actual angular velocity of the capstan 24 is the difference between the two components.

In the first instance, above, the signal on tape 13 tended to be linearly transported at a slower rate during the reproduce operation than it had during the record operation; however, the action of the servo control system increased the speed of the tape until the speeds were the same for both cycles of operation. Conversely, in the second instance the speed of the signal on tape 13 during the reproduce operation was greater than during the record operation and the action of the servo control system decreased the speed of the tape until the speeds were equal. When the speed of the signal on tape 13 is the same for both the record and reproduce operations, the signal from the control track 37 is in phase with the signal from the 200 c.p.s. source 39 and the second servo pulley 99 remains in a fixed position.

From the foregoing it is to be noted that the servo control motor 56 applies correction displacements to the constant angular velocity drive of the capstan 24 by the synchronous motor 44 to change the angular velocity of the capstan and, thereby, the linear velocity of the magnetic tape 13. Since such corrective displacements during the reproduce operation are substantially small, the servo control motor 56 may be a combined motor and speed reducer so that the maximum speed variation introduced at the capstan 24 by such motor is only two or three percent of the normal capstan speed. As a result the work required of the servo control motor 56 is substantially small and, therefore, the power rating and physical size of such motor, as well as the same characteristics of the power amplifier 54, are correspondingly small. The dynamic response characteristics of the servo control motor 56 are enhanced because the built-in speed reducer and additional reducer 57 (realized in the different diameters of the first and second servo pulleys 96, 99) result in inertia and frictional forces at the capstan 24 being reflected at the motor shaft inversely as the square of the total reduction ratio and the servo motor is not loaded by the relatively large inertia of the synchronous motor 44. Also, the slack takeup idlers 19, 28 respectively isolate the inertias of the supply and takeup reels 14, 32 from the capstan 24. Additionally, it is to be noted that the stator of the synchronous motor 44 and of the servo control motor 56 are both mounted in fixed positions on the motor plate 61, which fact is advantageous over systems where the servo control motor rotates the stator of the synchronous motor by eliminating the necessity for stator slip rings.

The second servo pulley 99, as shown in FIGURE 4, has an irregular cross section with substantially half of the pulley being enlarged to provide a suitable counterbalance mass to off-set the weight of the elements mounted on the other half thereof. Clearance is provided between the flexible plate 81 and the second servo pulley 99 so that a flywheel (not shown) may be mounted on the capstan pulley 76 to add inertia to the angular velocity of the capstan 24.

While the salient features of the invention have been shown and described in a single embodiment thereof, it will be apparent that numerous modifications and changes may be made within the spirit and scope of the invention and it is, therefore, not desired that the invention be limited to the exact details shown and described except insofar as set forth in the following claims.

What is claimed is:

1. In a speed control system for a magnetic tape recorder and reproducer having a wideband rotating head assembly, the combination comprising a capstan for engaging and linearly moving a magnetic tape, means for producing a control signal at a frequency related to the speed of said head assembly, magnetic means mounted adjacent to said tape for recording a magnetic track in response to said control signal, a planeary differential, a primary motor coupled to said capstan through said planetary differential for driving said capstan at a constant angular velocity, a secondary motor coupled to said differential, said magnetic means reproducing a signal from said track during the reproduce operation, comparator means coupled to said magnetic means and said signal producing means for developing an error signal proportional to difference in phase, and power means connected between said comparator and said secondary motor for altering the angular velocity of said capstan in accordance with said error signal.

2. In a speed control system for a magnetic tape recorder and reproducer having a wideband rotating head assembly, the combination comprising a capstan for engaging and linearly moving a magnetic tape, means for producing a control signal at a frequency related to the speed of said head assembly, magnetic means mounted adjacent to said tape for recording a magnetic track in response to said control signal, a rotatable element having a centrally mounted bearing for rotatably securing one end of said capstan, an eccentrically mounted bearing on said rotatable element for rotatably securing a rotatable shaft at an intermediate portion thereof, a primary motor having a drive shaft coupled to one end of said rotatable shaft, coupling means extended between an opposite end of said rotatable shaft and said capstan, means connected to said primary motor for energizing the motor to drive the capstan at a constant angular velocity, a secondary motor coupled to said rotatable element, said magnetic means reproducing a signal in response to said track during reproduce operation, comparator means coupled to said magnetic means and said signal producing means for developing an error signal proportional to differences in phase, and power means connected between said comparator means and said secondary motor for altering the angular velocity of said capstan in accordance with said error signal.

3. In a speed control system for a magnetic tape recorder and reproducer having a wideband rotating head assembly, the combination comprising a capstan for engaging and linearly moving a magnetic tape past said head assembly, a primary motor having a drive shaft in alignment with said capstan, a rotatable shaft mounted parallel to said drive shaft and being offset therefrom. a rotatable element having a centrally disposed journal for rotatably securing said capstan, an eccentrically disposed journal on said rotatable element for rotatably securing said rotatable shaft, means extended between said drive shaft and said rotatable shaft for rotation thereof, means extended between said rotatable shaft and said capstan for driving the capstan, means connected to said primary motor for energizing the motor to drive said capstan at a constant angular velocity, a secondary motor coupled to said rotatable element for rotation thereof, means for producing a control signal at a frequency related to the speed of said head assembly, magnetic means mounted adjacent to said tape for recording a longitudinal magnetic track in response to said control signal, said magnetic means reproducing a signal in response to said track during reproduce operation, comparator means coupled to said magnetic means and said signal producing means for developing an error signal proportional to differences in phase, and power means connected between said comparator means and said secondary motor for altering the angular velocity of said capstan in accordance with said error signal.

4. In a speed control system for a magnetic tape recorder and reproducer having a wideband rotating head assembly, the combination comprising a capstan for engaging and linearly moving a magnetic tape past said head assembly, a primary motor having a drive shaft in alignment with said capstan, a first pulley mounted on the drive shaft of said primary motor, a driven shaft mounted parallel to and offset from the drive shaft of said primary motor and having a lower pulley and an upper pulley, a first belt mounted to engage said first pulley and said lower pulley, a second pulley mounted on said capstan, a second belt mounted to engage said upper pulley and said second pulley, means connected to said primary motor for energizing the motor to rotate said capstan at a constant angular velocity, a secondary motor having a drive shaft, a first servo pulley mounted on the drive shaft of said secondary motor, a second servo pulley having a centrally disposed bearing for journalling one end of said capstan and an eccentrically disposed bearing for journalling said driven shaft, a servo belt mounted to engage said first and second servo pulleys, magnetic means mounted adjacent to said tape for recording a magnetic track in response to a source of signal at a frequency related to the speed of said head assembly during record operation, said magnetic means reproducing a signal in response to said track during reproduce operation, comparator means coupled to said magnetic means and said source of signal for developing an error signal proportional to differences in phase, and power means connected between said comparator means and said secondary motor for altering the angular velocity of said capstan in accordance with said error signal.

5. The combination of claim 4 wherein said power pulley is larger in diameter than said first pulley, said second pulley is larger in diameter than said upper pulley, and said second servo pulley is larger in diameter than said first servo pulley whereby speed reductions are provided to reduce the required power rating and physical size of said secondary motor.

6. In a tape drive means for a magnetic tape recorder and reproducer, the combination comprising, a capstan, a primary motor having a drive shaft mounted in line with said capstan, a secondary rotatable shaft mounted parallel to and offset from said capstan and being coupled to said capstan and to the drive shaft of said primary motor, means connected to said primary motor to drive said capstan at a constant angular velocity, a rotatable element having a centrally disposed bearing for rotatably securing said capstan and an eccentrically disposed bearing for rotatably securing said secondary shaft, a secondary motor having a drive shaft coupled to said rotatable element, and variable means connected to said secondary motor for energizing the motor and selectively rotate said secondary shaft about said capstan to alter the angular velocity of said principal shaft.

7. In a tape drive means for a magnetic tape recorder and reproducer, the combination comprising, a capstan, a primary motor having a drive shaft, a first pulley mounted on the drive shaft of said primary motor, a driven shaft mounted parallel to the drive shaft of said primary motor and having a lower pulley and an upper pulley, a first belt mounted to engage said first pulley and said lower pulley, a second pulley mounted on said capstan, a second belt mounted to engage said upper pulley and said second pulley, means connected to said primary motor for energizing the motor to rotate said capstan at a constant angular velocity, a secondary motor having a drive shaft, a first servo pulley mounted on the drive shaft of said secondary motor, a second servo pulley having a centrally disposed bearing for journalling one end of said capstan and an eccentrically disposed bearing for journalling said driven shaft between said upper and lower pulleys, a servo belt mounted to engage said first and second servo pulleys, and means connected to said secondary motor to energize the motor selectively and alter the angular velocity of said capstan.

8. The combination of claim 7 wherein said lower pulley has a larger diameter than said first pulley, said second pulley has a larger diameter than said upper pulley, and said second servo pulley has a larger diameter than said first servo pulley whereby speed reductions are provided to reduce the required power rating and physical size of said secondary motor.

References Cited by the Examiner

UNITED STATES PATENTS

| | | | |
|---|---|---|---|
| 2,108,368 | 2/38 | Christian | 74—689 |
| 2,709,204 | 5/55 | Holmes | 179—100.2 |
| 2,788,209 | 4/57 | Montijo | 226—186 |
| 2,846,217 | 8/58 | Bormann | 226—186 |
| 2,963,555 | 12/60 | Brubaker | 179—100.2 |

IRVING L. SRAGOW, *Primary Examiner.*

NEWTON N. LOVEWELL, DAVID G. REDINBAUGH, *Examiners.*